US008800149B2

(12) United States Patent
Balsa Gonzalez et al.

(10) Patent No.: US 8,800,149 B2
(45) Date of Patent: Aug. 12, 2014

(54) PROCESS FOR REPAIRING AIRPLANE PANELS

(75) Inventors: Alberto Balsa Gonzalez, Madrid (ES); Francisco de Paula Burgos Gallego, Madrid (ES)

(73) Assignee: Airbus Operations S.L., Getafe (ES)

( * ) Notice: Subject to any disclaimer, the term of this patent is extended or adjusted under 35 U.S.C. 154(b) by 268 days.

(21) Appl. No.: 13/266,135

(22) PCT Filed: May 27, 2010

(86) PCT No.: PCT/ES2010/070351
§ 371 (c)(1),
(2), (4) Date: Jan. 11, 2012

(87) PCT Pub. No.: WO2010/136630
PCT Pub. Date: Dec. 2, 2010

(65) Prior Publication Data
US 2012/0110811 A1    May 10, 2012

(30) Foreign Application Priority Data

May 29, 2009   (ES) .................................. 200930228

(51) Int. Cl.
*B21D 47/00*    (2006.01)

(52) U.S. Cl.
USPC .................... 29/897.1; 29/402.09; 29/402.11; 29/402.12; 29/402.14; 29/897; 29/897.2; 156/58; 156/64; 156/92; 156/94; 156/98; 382/141

(58) Field of Classification Search
USPC ............... 29/402.09, 402.11, 402.12, 402.14, 29/897, 897.1, 897.2; 156/58, 64, 92, 94, 156/98; 382/141
See application file for complete search history.

(56) References Cited

U.S. PATENT DOCUMENTS

| 5,023,987 | A | 6/1991 | Wuepper et al. |
| 5,928,448 | A * | 7/1999 | Daws .............................. 156/98 |
| 8,218,852 | B2 * | 7/2012 | Cork et al. .................... 382/141 |

OTHER PUBLICATIONS

Baker, A. A., "Repair Techniques for Composite Structures," Composite Materials in Aircraft Structures, pp. 207-227, (Jan. 1, 1990) XP008103764.
International Search Report Issued Mar. 28, 2011 in PCT/ES10/070351 Filed May 27, 2010.

* cited by examiner

*Primary Examiner* — Richard Chang
(74) *Attorney, Agent, or Firm* — Oblon, Spivak, McClelland, Maier & Neustadt, L.L.P.

(57) ABSTRACT

A repair process for a composite material panel that forms part of a fuselage, wings, or stabilizers of an aircraft, with the panel having large dimensions and including irregular contours in some areas and edges prone to damages occurring from handling and assembly of the panel. The process a) locates the damage in the element of the composite material panel; b) sands the area that includes the damage in an area larger than the damage, makes a cut in the panel, having the cut of a same form as a piece that will serve to repair panel; c) places the piece in the cut, so that it is perfectly flush with the panel to be repaired; and d) attaches the piece to the composite material panel.

6 Claims, 6 Drawing Sheets

PROCESS FOR REPAIRING AIRPLANE PANELS

FIELD OF THE INVENTION

The present invention refers to a process of repairing airplane panels of large dimensions and irregular contours, in particular the panels forming the fuselage, wings or stabilizers.

BACKGROUND OF THE INVENTION

Currently, large parts of the panels that form the wings, stabilizers and parts of the fuselage of an airplane are fabricated of composite material, due to the reduced weight and which doubtlessly provide advantages in the field of aeronautics.

These panels are able to suffer, in the assembly process (which includes the handling, their own assembly, and the transfers) accidental damage. Following these said damages, the piece or panel is repaired or rejected. Particularly in the case of airplane panels with large dimensions, the probability of damage occurring to the piece is much higher than in other types of pieces, being the damaged area of a clearly irregular contour, upon being these irregular contours the area most likely to suffer these damages, the said damages are repaired through a very laborious process, elevating the cost and time to carry out the said process of repair.

Presently, the procedures of repair of the composite material aircraft panels are very expensive and laborious.

Thus, in the case of repairing large composite airplane panels, the following process at present consists of primarily cleaning the affected or damaged area, sanding the damaged area and step by step drawing out the fiber fabric in an area much bigger than the initially damaged area. The fabric which is removed will be returned to the same area and, with respect to the composite material, it should be placed again in the panel and processed and then cured in an autoclave. This entire process involves a large amount of time and expense, and there are not always available the necessary materials and infrastructures. This type of repair requires a specific technology, after which the area affected by the repair is much bigger than the initial damaged area.

The present invention offers a solution to the aforementioned problems.

SUMMARY OF THE INVENTION

According to the invention, a procedure has been developed to repair the composite material panels of an aircraft, with these panels having large dimensions, and the damage being located in the same area of an edge of the panel, with said edge having an irregular contour. The invention consists of the following phases:
  a. locating the damaged area of the composite panel.
  b. Sanding the damaged area and the immediately surrounding areas, removing the necessary layer or layers of composite material, forming a cut in the composite material, with said cut being the same form of a predefined piece, with said predefined pieces for each type of airplane panel that will be repaired:
  c. Placement of the predefined piece into the previous cut, such that the piece is completely level with the panel to be repaired.
  d. Securing the predefined, material composite piece.

All of the above, according to the process of the invention, results in a repair which is reliable, quick and economical, further advancing the adaptability of repairs to panels with edge damage.

Other features and advantages of the invention will become more readily apparent from the following detailed description when taken together with the drawings.

DETAILED DESCRIPTION OF THE INVENTION

According to what has been mentioned, panel 1 of the composite material forms part of the fuselage, the wings or the stabilizers of said airplane, will have large dimensions and in certain areas irregular contours, comprising of edges 2 or elements that are prone to damage in the handling and assembly of said panel 1.

Figure 1:
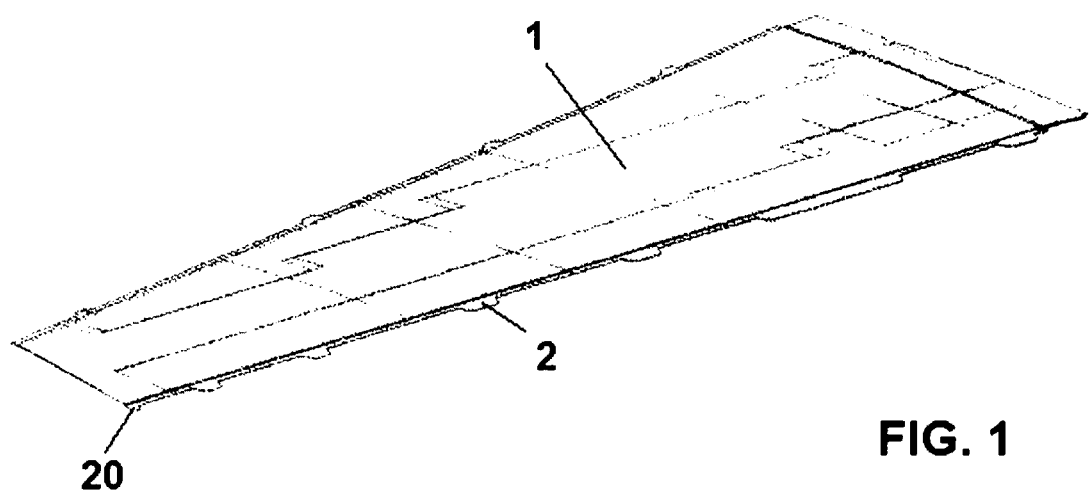
FIG. 1 shows a sketch of an airplane panel of composite material with irregular contours, which is the object of the present invention.
Figure 2:
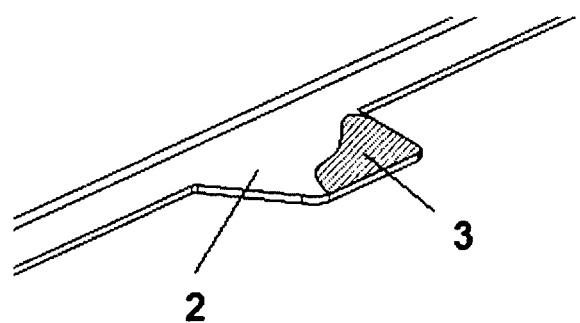
FIG. 2 shows the detail of the damage suffered in an edge of an airplane panel with irregular contours of FIG. 1.
Figure 3:
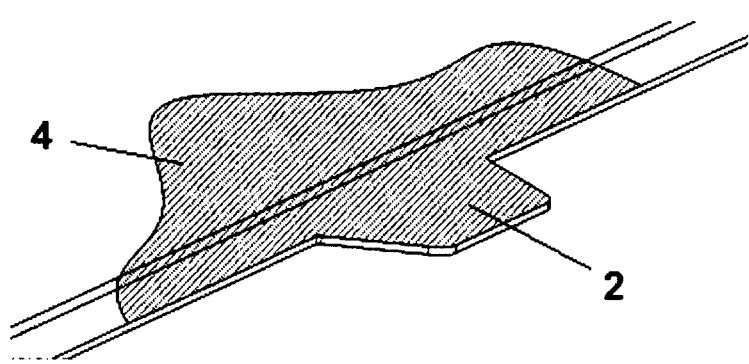
FIG. 3 shows the sanding that is necessary to remove the damage in FIG. 2, according to the well known technique.
Figure 4:
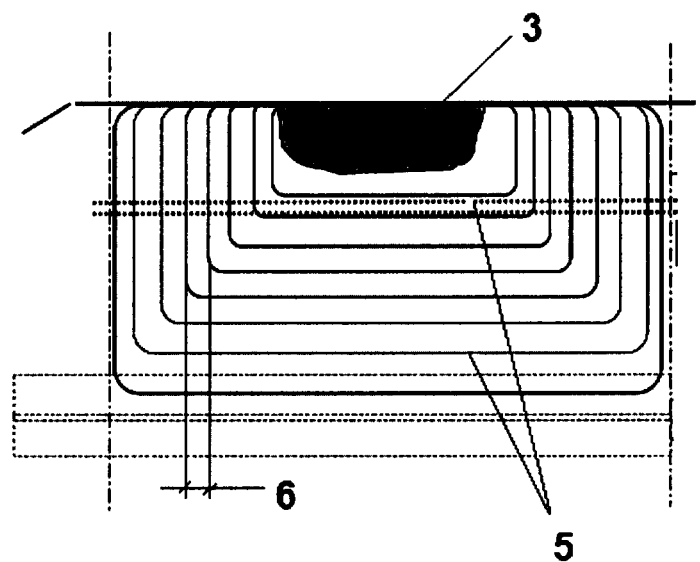
FIG. 4 shows a sketch of the repair process with fabric of composite material according to the well known technique.

The repair process of panel 1 comprising of the element 2 that has suffered damage 3 (FIGS. 1 and 2) is currently carried out in the following steps:
  a) location and detection of the area or damage 3 in the used element 2 (FIG. 2);
  b) sanding and cleaning of the area 4 of element 2, to remove the necessary fiber fabric layers, in a staggered form, being that the sanded area 4 is much bigger than the area or damage 3 in the element 2 (FIG. 3);
  c) reposition, in the same way that they had been withdrawn, the repaired fiber fabric layers 5, arranged with a predefined overlap or orientation 6 (FIG. 4);
  d) curing of the repaired fiber fabric 5.

Thus, the aforementioned process of repair that is usually used involves a large investment of time and money, besides presenting the problem that there is not always the arrangements of the materials and infrastructures necessary to carry out this type of repair. Additionally, this type of repair requires a specific technology and the affected area 4 after completion is much bigger than the initially damaged area 3.

Figure 5:
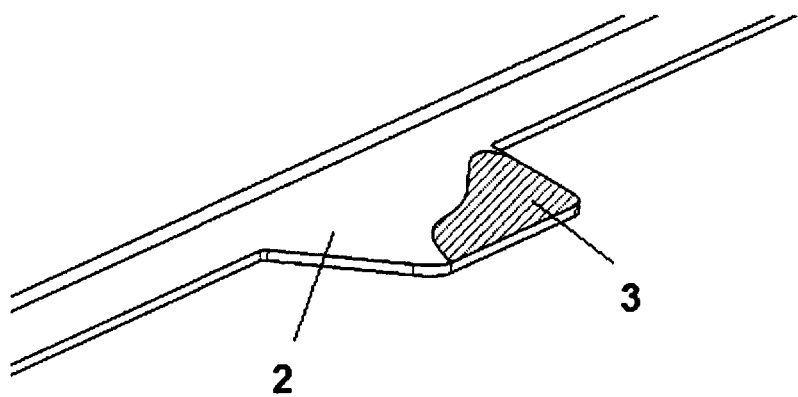
FIG. 5 shows damage suffered in an edge of a airplane panel that has been repaired according to the present invention.
Figure 6:
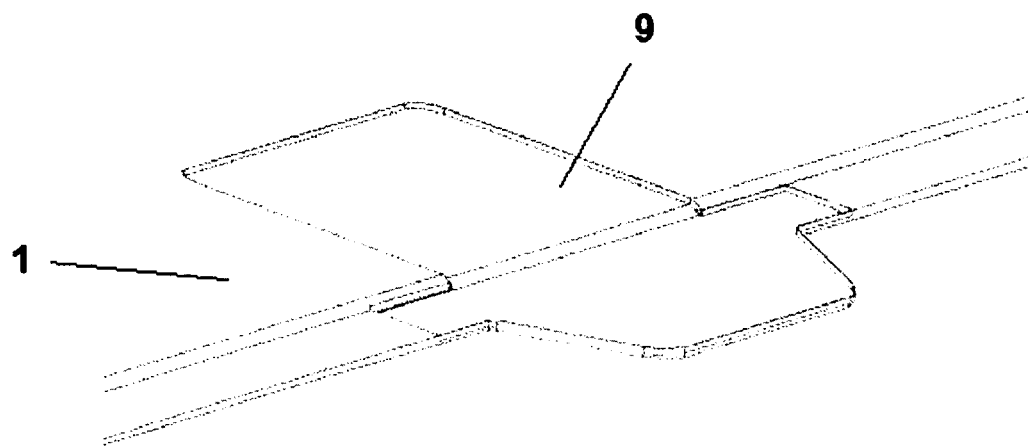
FIG. 6 shows a sketch of the cut in the composite material panel according to the process of the present invention.
Figure 7:
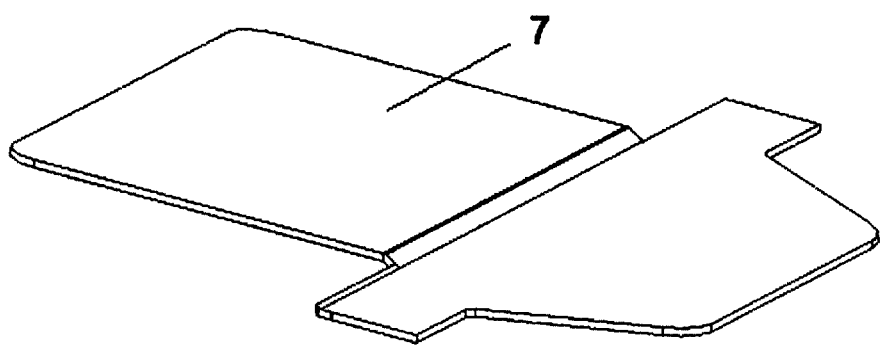
FIG. 7 shows a sketch of the predefined piece that will be used in the present invention.
Figure 8:
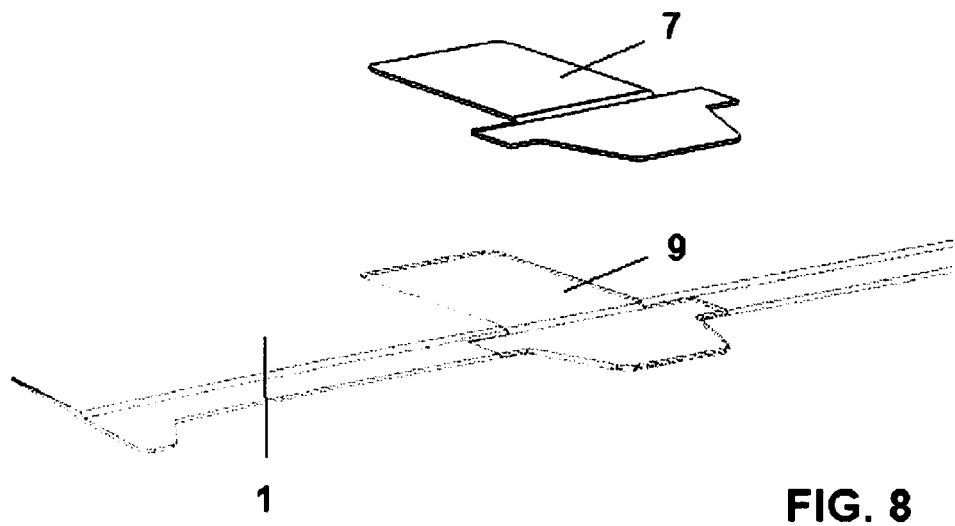
FIG. 8 shows the joint of the predefined piece of the panel of the composite material according to the present invention.
Figure 9:
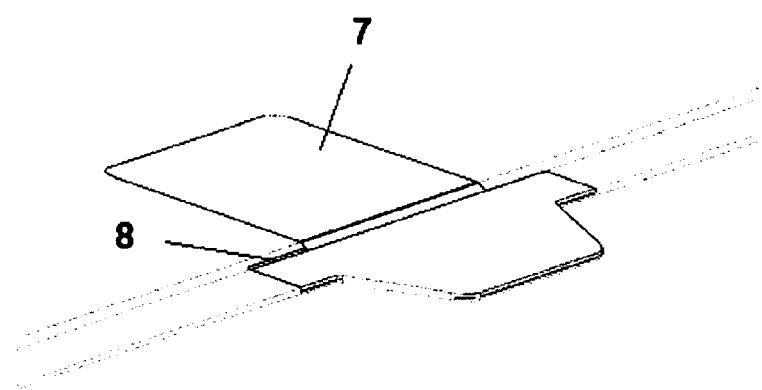
FIG. 9 shows the result of the fastening of the predefined piece in the composite material panel according to the present invention.

Thus, the following method of repair of a damaged area 3 of element 2 of a panel 1 comprising of the following steps:
  a) Locating the damage 3 in the element 2 of the composite material panel 1 (FIG. 5);

b) sanding the area that contains the damage 3 in an area larger than said damage 3, making a cut 9 in the composite material panel 1, having said cut 9 of a predefined shape 7 (FIG. 7) that will serve to repair panel 1, being said predefined pieces 7 for each type of aircraft panel that should be repaired (FIG. 6);

c) Placement of the predefined piece 7 into the cut 9, so that it is perfectly flush or level with panel 1 (FIGS. 8 and 9);

d) Fastening predefined piece 7 to composite material panel 1.

The new repair process according to the present invention consists thus of one piece 7 of definite geometry that covers the damaged service 3 and is fastened to the sanded area. Said piece 7 will be of a material with sufficient strength to support the loads that pass through the damaged area 3, preferably steel. The aforementioned piece 7 will be joined to panel 1, remaining in this way totally joined to said panel 1. The piece 7 of the repair will be joined to panel 1 preferably with rivets.

Said piece 7 should remain totally flush with the rest of the surface of panel 1 so that it does not damage the aerodynamics of area 2, for that reason the panel 1 cut is the same as the geometry of piece 7 which will fit together, ensuring that alongside said cut 9 a space 8 sufficient to easily mount said piece 7 on panel 1.

One of the advantages of this repair process is the possibility to standardize the type of pieces 7 for each panel 1 that would need repair, so that, before accidental damage, there is already a designed and defined piece 7, saving time and cost, upon being the standard process.

Another of the advantages of this repair process is that it is not necessary to cure the repaired piece in an autoclave or to have composite material stored in a cold-storage room. In conclusion, it is a method of repair that can be performed without needing special teams at one's disposal and or seldom used materials.

Figure 10:
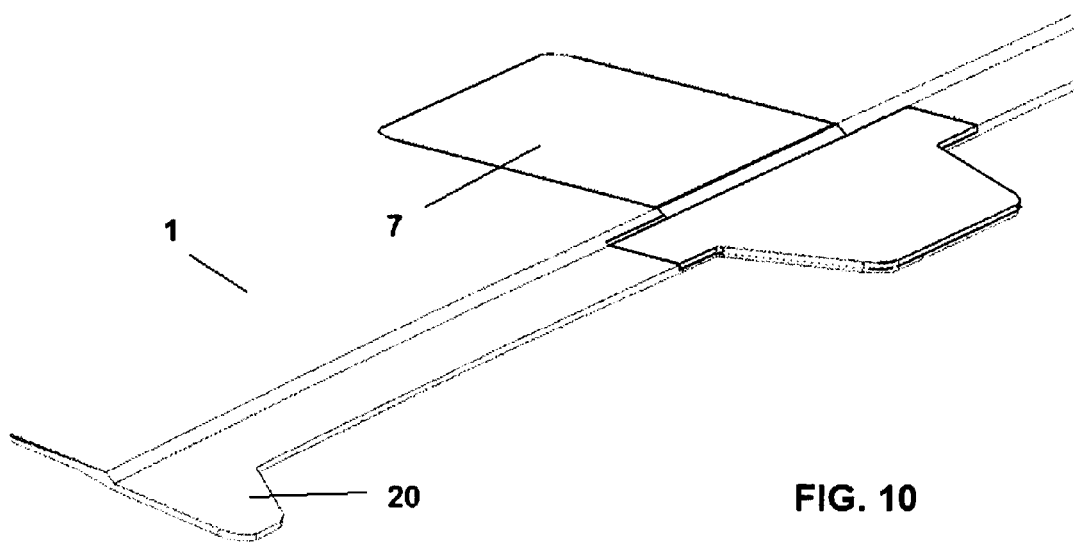
FIG. 10 shows a variation of the edge with irregular contours which can also be repaired using the present invention.

Taking everything into account, using the described method of repair results in a fast, economical and reliable repair, allowing for repair to be adapted to whichever edge 2 of contours, including a geometrically different area 20 (FIG. 10), applying the same process of repair.

While the preferred embodiment has been shown and described, it is to be understood that various changes and modifications can be introduced without departing from the scope of the invention as set forth in the following claims.

The invention claimed is:

1. A repair process for a composite material panel that forms part of a fuselage, wings, or stabilizers of an aircraft, with the panel having large dimensions and including irregular contours and edges prone to damages occurring from handling and assembly of the panel, the process comprising:
   a) locating a damaged area in an element of the composite material panel;
   b) sanding an area including the damaged area, the area being larger than the damaged area, and making a cut in the panel, the cut being in a same shape as a shape of a predefined piece that will serve to repair the panel;
   c) placing the predefined piece in the cut such that the predefined piece is perfectly flush with the panel to be repaired; and
   d) attaching the predefined piece to the composite material panel.

2. The process according to claim 1, wherein a shape of the predefined piece is predefined for each type of panel of the aircraft that needs to be repaired.

3. The process according to claim 1, wherein a material of the predefined piece is a material with necessary strength to support loads which will pass through the damaged area.

4. The process according to claim 3, wherein predefined the piece is steel.

5. The process as in claim 1, wherein the predefined piece is attached to the composite material panel with rivets.

6. The process as in claim 1, wherein the cut is large enough to include sufficient clearance so that the predefined piece is easily fitted in the panel.

* * * * *

UNITED STATES PATENT AND TRADEMARK OFFICE
CERTIFICATE OF CORRECTION

PATENT NO. : 8,800,149 B2
APPLICATION NO. : 13/266135
DATED : August 12, 2014
INVENTOR(S) : Francisco de Paula Burgos Gallego et al.

Page 1 of 1

It is certified that error appears in the above-identified patent and that said Letters Patent is hereby corrected as shown below:

On the title page, Item (12), the Letters Patent Heading, and Item (75), the order of Inventors are incorrect. Items (12) and (75) should read:

item (12)  United States Patent
           Burgos Gallego et al.

item (75)  Inventors:  Francisco de Paula Burgos Gallego, Madrid (ES);
                       Alberto Balsa Gonzalez, Madrid (ES)

Signed and Sealed this
Ninth Day of December, 2014

Michelle K. Lee
*Deputy Director of the United States Patent and Trademark Office*